United States Patent Office.

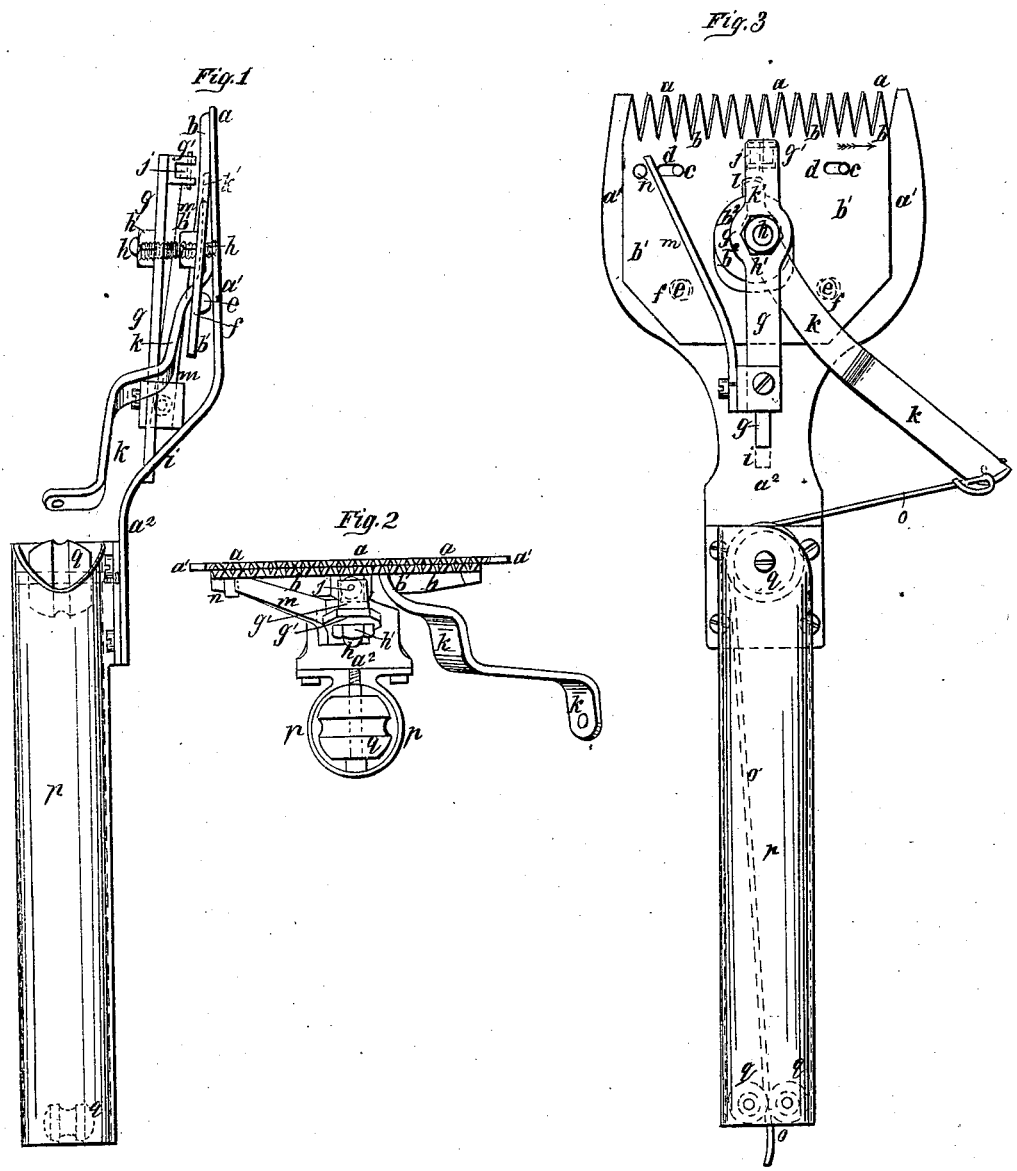

ARTHUR DALLISON RENSHAW, OF LONDON, ENGLAND.

*Letters Patent No. 77,093, dated April 21, 1868.*

---

IMPROVED APPARATUS FOR CLIPPING THE HAIR OF ANIMALS.

---

*The Schedule referred to in these Letters Patent and making part of the same.*

---

TO WHOM IT MAY CONCERN:

Be it known that I, ARTHUR DALLISON RENSHAW, of London, England, have invented "a new and useful Apparatus for Shearing or Clipping the Wool or Hair of Animals;" and I do hereby delare that the following is a full and exact description thereof, reference being had to the accompanying sheet of drawings, forming a part of this specification.

My invention relates to an apparatus for shearing sheep and clipping the hair of horses and other animals by the action of reciprocating cutters, which move across the edges of fixed cutters, and cut in both directions.

The said invention consists chiefly in the peculiar construction and arrangement of such cutters, and in their combination with certain novel devices for insuring their easy and effective working, and their ready and accurate adjustment.

The fixed cutters are formed on or rigidly attached to a metal plate which is connected to the handle or rod whereby the apparatus is held when in use. The reciprocating cutters are fitted to work in close contact with the fixed cutters, and their edges are so formed and arranged that each pair of cutters works together with an action similar to that of a pair of scissors. The cutters may be formed by cutting out the apertures between them in the edge of a steel plate, or each cutter may be formed separately, and a number of them secured in a back or stock.

In using the apparatus, the fixed cutters lie next to the skin of the animal, and these cutters project slightly beyond the points of the reciprocating cutters, thereby preventing any possibility of injury to the skin from contact with the latter. The extremities of the cutters are rounded or curved at the back, leaving no sharp edges, whereby the animal might be accidentally injured. The fixed and reciprocating cutters are kept parallel with each other by guide-pins or other suitable devices, which allow one plate to slide freely endwise upon the other.

The reciprocating cutters are operated by means of a lever, which is pivoted to the plate or stock of the fixed cutters, or to some other convenient portion of the apparatus, a spring being employed to draw the cutters back at each reciprocation. It is necessary that the fixed and reciprocating cutters should be kept closely in contact, otherwise they will not act properly, and for this purpose I attach to the apparatus an adjustable presser-bar, whose pressure upon the cutters is regulated by a screw or other suitable device. To insure the required close contact of the said cutters, without the friction naturally resulting from the rubbing of one surface upon another, I employ small anti-friction balls or rollers between the plates, and also upon the foot or feet of the presser-bar.

I construct my apparatus either to be manipulated by hand, or provide the same with means for connecting it with driving-mechanism, operated by steam or other motive-power, the connection between the apparatus and such driving-mechanism being made by cords, bands, or wires, arranged and operating in such a manner as to allow the apparatus to be freely moved in any direction to adapt it to the position and form of the animal being sheared.

Description of the Drawings.

Figure 1 is a view of one side of my apparatus, showing the same constructed to be operated by a cord or band connected with any suitable driving-mechanism.

Figure 2 is an edge view of the said apparatus; and

Figure 3 is a front view of the same.

Like letters indicate the same parts in each of the figures.

The fixed cutters $a$ and plate $a^1$ may be made in one piece with the shank or bar $a^2$, as shown, or may be attached to the same by screws, rivets, or other suitable fastenings. The reciprocating cutters $b$ are fixed or formed upon the plate $b^1$. The latter is preferably made somewhat shorter than the plate $a^1$, to allow the cutters $b$ to move the required distance without passing beyond the edges of the plate $a^1$. The cutters $b$ are guided by pins or studs, $c$, secured in the plate $a^1$, and projecting upwards into the apertures or slot $d$, which are made of the proper length to allow sufficient motion to the said cutters. The friction-balls $e$, at the rear of the plate $b^1$, are made of steel, iron, or other sufficiently hard metal, and are fitted to roll in the grooves $f$ in the plate $b^1$, and upon the surface of the plate $a^1$. It will be seen, by referring to fig. 1, that the plate $b^1$ is only in contact with the plate $a^1$ for a short space beyond the bottom of the cutting-edges, and therefore moves freely upon the balls $e$. The adjustable arm or bar $g$ is kept in place by the screw-pin $h$, which is secured in the plate $a^1$. The rear end of this bar rests in the aperture $i$, and by means of the nut $h'$, the pressure of the forward end of the said bar upon the plate $b^1$ is increased or diminished. The foot $g'$ of the bar $g$ may be provided with a friction-roller, $j$, as shown, or with a ball similar to the balls $e$, or the said foot or end of the bar may be extended laterally, and provided with two or more of such balls or rollers.

The pin $h$ also serves as a fulcrum for the lever $k$, whereby the reciprocating cutters $b$ are operated. The boss or centre of this lever lies in the aperture $b^2$, formed in the plate $b^1$, and is provided with a finger or stud, $k'$, which extends into and fits the recess $l$ in the said plate, the bearing-surfaces of this finger being rounded to cause it to work freely against the sides of the said recess. By this lever, the cutters $b$ are moved in the direction of the arrow, the said cutters being drawn in the opposite direction by the spring $m$, which is secured to the bar $g$, or other convenient part of the apparatus, and bears against the pin $n$ projecting from the top of the plate $b^1$.

The cord $o$, attached to the end of the lever $k$, is extended through the handle $p$, which is made hollow, and provided with guide-pulleys, $q$. The other end of the cord is connected to a crank-lever or eccentric fixed on a driving-shaft, and operated by hand, steam, or other power. If desired, the spring $m$ may be dispensed with, and the lever $k$ pulled in each direction by a cord connected with a crank or other device. The lever $k$ may also be operated by a cam or disk fitted to turn upon a pin or stud arranged in front of the handle $p$, and caused to rotate by a cord or band passing over a pulley connected with suitable driving-mechanism, or the lever $k$ may be provided with a handle, the apparatus being then manipulated by hand like other shearing-implements for various purposes. The handle $p$ is shown constructed of metal tubing, but may be formed of wood or other suitable material.

The apparatus may be provided with a guard or cover to protect the mechanism and keep the hair or wool from becoming entangled with the same. A comb may be attached to this cover, or to the plate $a^1$, the teeth of the said comb being extended over the points of the cutters. The said comb is made adjustable by means of screws or other devices to regulate the length to which the hair or wool is cut.

What I claim, and desire to secure by Letters Patent, is—

1. The cutters $a$ and $b$, constructed, combined, and operating, substantially as and for the purpose set forth.

2. The combination of the said cutters with the adjustable presser-bar $g$ and lever $k$, and with or without the spring $m$, for the purposes and substantially as set forth.

3. Operating the lever $k$ by means of a cord or wire passed through the handle $p$, or over a rotating-cam or disk, and connected with any suitable driving-mechanism, substantially as set forth.

ARTHUR DALLISON RENSHAW. [L. S.]

Witnesses:
WILLIAM ROBERT LAKE,
THOS. W. PALMER.